Figure 1:
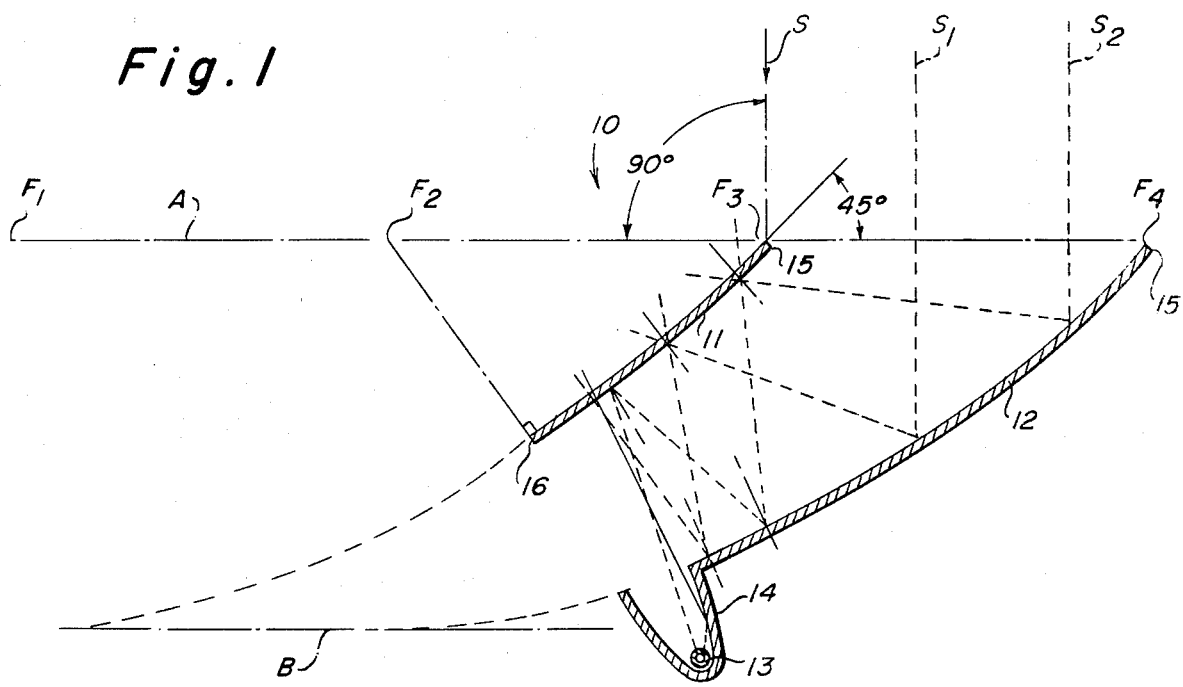

United States Patent [19]

DeGeus

[11] 4,222,370

[45] Sep. 16, 1980

[54] NONTRACKING CONCENTRATING SOLAR COLLECTOR

[76] Inventor: Arie M. DeGeus, 6625 4th St., South, St. Petersburg, Fla. 33705

[21] Appl. No.: 906,825

[22] Filed: May 17, 1978

[51] Int. Cl.³ ................................................ F24J 3/02
[52] U.S. Cl. .................................... 126/439; 350/299
[58] Field of Search ................ 126/438, 439; 350/288, 350/292, 293, 294, 299

[56] References Cited

U.S. PATENT DOCUMENTS

| | | | |
|---|---|---|---|
| 3,964,464 | 6/1976 | Hockman | 126/271 |
| 4,079,724 | 3/1978 | Zwillinger | 126/439 |
| 4,131,485 | 12/1978 | Meinel et al. | 126/439 |

Primary Examiner—James C. Yeung
Attorney, Agent, or Firm—Dressler, Goldsmith, Shore, Sutker & Milnamow, Ltd.

[57] ABSTRACT

A nontracking concentrating solar collector is provided in which a series of parallel parabolic reflector segments reflective on both sides thereof are disposed with their focal points lying in a plane which is at approximately a right angle to the angle of incident solar radiation which is received in the space between the upper ends of the reflector segments. The length of the reflector segments is selected so that the incident radiation is reflected back and forth between the segments until an even numbered reflection, preferably either the fourth or the sixth reflection, emerges downwardly from between the reflector segments in a narrowed beam which is received by a solar collector. Preferably, the collector is a tube carrying a heat transfer medium which is positioned beneath the reflector segments other than the first segment in the series, and paralleling said segments, and a secondary reflector is positioned beneath the tubes to concentrate the reflections emerging from the reflector segments upon the tubes.

9 Claims, 2 Drawing Figures

NONTRACKING CONCENTRATING SOLAR COLLECTOR

This invention relates to nontracking concentrating solar collectors.

The essence of the problem of practicably converting solar radiation to electrical power is the excessive cost of collecting and concentrating that radiation. The existing concentrating collectors are generally large reflectors, but these must be very massive to resist the wind and they must be moved to track the sun. The expense of such systems is manifest.

In this invention, a nontracking concentrating solar collector is provided in which a series of parallel parabolic reflector segments reflective on both sides thereof are disposed with their focal points lying in a plane which is at approximately a right angle to the angle of incident solar radiation which is received in the space between the upper ends of the reflector segments. The length of the reflector segments is selected so that the incident radiation is reflected back and forth between the segments until an even numbered reflection, preferably either the fourth or the sixth reflection, emerges downwardly from between the reflector segments in a narrowed beam which is received by a solar collector. Preferably, the collector is a tube carrying a heat transfer medium which is positioned beneath the reflector segments other than the first segment in the series, and paralleling said segments, and a secondary reflector is positioned beneath the tubes to concentrate the reflections emerging from the reflector segments upon the tubes.

The secondary reflector is at least partially parabolic, and is most desirably constituted by a double cusp reflector. Nonparabolic reflectors are also useful.

In preferred construction, the angle between the upper end of the parabolic segments and the focal plane of these segments is substantially 45° with the upper ends of these segments terminating in the focal plane. Also, the parabolic segments are desirably selected to have a parabolic function corresponding to the equation $y = x^2/20$ where x and y are the horizontal and vertical axes, respectively, on which the parabola is plotted. Further, the parabolic minima of the several segments forms a line paralleling the focal plane of the segments and the parabolic segments allow light to pass downwardly by their lower ends short of the minima position. This provides a continuous open space between the parabolic segments so wind can pass through instead of destroying the reflectors as is commonly encountered even when the construction is massive to resist strong winds. Lastly, it is desirable that the distance between the upper ends of the several reflectors be the same as the distance between the focal plane and the plane of the parabolic minima.

When the focal plane is at a right angle to the incident radiation, maximum efficiency is achieved. Thus, the focal plane is adjusted so that a right angle with the sun is achieved at its maximum elevation. At lesser angles, the efficiency falls off with the cosine of the angle of deviation from the right angle and this reduced efficiency is accepted because it is small and because it eliminates tracking.

The angle of the incident radiation should not be allowed to exceed 90° to the focal plane because efficiency falls off very rapidly. Even so, the reflector is effective during most of the day.

To maximize efficiency, the angle between the focal plane and the horizontal should be adjusted for the season. The more frequently one adjusts this angle, the greater the efficiency. Weekly adjustment is quite satisfactory.

To stress the fact, during a given day's solar collection, the angle with the horizontal is not changed and the entire structure has an east-west disposition which remains unchanged throughout the year.

Figure 2:
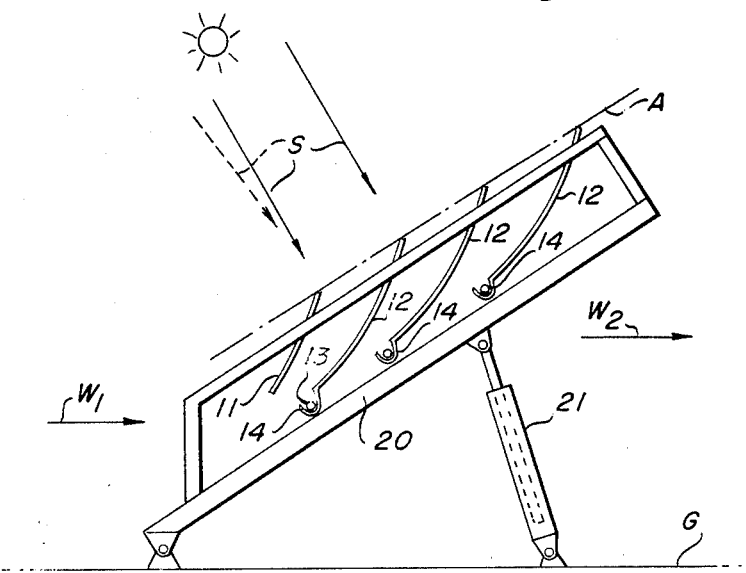

The invention will be more fully understood from the accompanying drawing in which:

FIG. 1 is a diagrammatic cross-section showing the disposition of the parabolic segments and secondary reflector used in this invention; and FIG. 2 is an end view showing overall construction.

Referring more particularly to FIG. 1, the solar collector is identified generally by the numeral 10, and it contains a series of parabolic reflector segments 11 and 12. The reflector segment 11 is shorter than the remaining reflector segments 12, and all of the reflector segments are parallel to one another. At the lower end of each of the reflector segments 12 is a solar collector, in the preferred form of the invention, these collectors being in the form of a tube 13 through which a heat transfer medium is pumped in order to heat the medium as it flows through the tube. Around the tube 13 and facing the reflector segment 11 is a secondary collector 14 which may be parabolic. In the preferred form shown, the parabolic secondary collector 14 is of double cusp construction, and it serves to enclose the tube 13 so as to minimize convection losses. The upper ends 15 of the various reflector segments 11 and 12 are disposed to lie in a focal plane A, the focal point for each reflector being identified at $F_1$, $F_2$, $F_3$, and $F_4$. $F_1$ identifies the focal point of reflector segment 11, $F_2$ identifies the focal point of reflector segment 12, with the reflector segments for $F_3$, $F_4$, and so forth not being shown. The desired solar radiation is identified by arrow S, and it is shown in its preferred disposition at a right angle to the focal plane A.

In the device shown, radiation enters the space between reflectors 11 and 12 which corresponds to the distance between the focal points $F_3$ and $F_4$. In a typical construction, this distance would be about 3–4 feet. Both sides of the various reflector segments are reflective so that incident radiation will bounce off the reflector 12, and then bounce off the reflector 11, back to the reflector 12, and back again to the reflector 11 and, thence, to the tube 13. It is particularly desired in this invention that either the fourth or sixth reflection emerge downwardly from between the reflector segments to be received by the solar collector. With fewer reflections, the desired narrowing of the incident beam is not adequately obtained, and with more reflections, the beam is narrower, but some loss is sustained with each reflection, and from four to six reflections provides a practical balance between desired concentration and undesired loss.

While the emergent radiations can be intercepted directly either by the tube 13 or by a solar cell, it is particularly desired to employ a secondary reflector in order to further concentrate the solar radiations upon the tubular collector 13 so as to maximize the temperature which can be obtained.

It is entirely practical to have a 6:1 concentration as between the incident solar radiation and the narrowed beam which is directed from the reflector segment 11 toward the tube 13. A further concentration of 4:1 for the secondary reflector 14 is also practicable, providing a net concentration ratio of 24:1. Incidental losses of various type can occur so that a practical concentration ratio is from about 15:1 to about 20:1.

The parabolas constituting the parabolic segments 11 and 12 are extended in dotted lines in order to define the minima for each parabola and the plane B which extends through these minima. As will be seen, the distance between the focal points $F_1$ and $F_2$ is approximately the same as the spacing between the focal plane A and the minima plane B.

A perpendicular has been dropped from the focal point $F_2$ to the parabolic segment 11. The incident radiation which is reflected back and forth between the segments 11 and 12 cannot usefully extend beyond this point, identified by numeral 16.

Operation in accordance with the invention is illustrated by two incident rays of light, $S_1$ and $S_2$. The back and forth reflection of the beams $S_1$ and $S_2$ in order to produce a narrowed beam can easily be seen from an examination of the drawing.

In practice, and as illustrated in FIG. 2, the solar collector is mounted upon a suitable support 20, the solar radiation S is received by the parabolic segments 11 and 12, and is concentrated as previously described in the tubes 13 within the surrounding collectors 14. The opening between the various reflector segments allows the incoming wind, identified by $W_1$, to go through the structure as indicated by $W_2$. An adjustable support 21 is employed so that the angle between the plane A and the ground G can be varied as previously described.

The heated fluid which is obtained can be converted into useful power or otherwise employed in conventional fashion, and the utilization of the energy collected forms no part of this invention.

I claim:

1. A nontracking concentrating solar collector comprising a series of parallel parabolic reflector segments reflective on both surfaces thereof, the focal points of said reflectors lying in a plane which is at approximately a right angle to the angle of incident solar radiation which is received in the space between the upper ends of said reflector segments, the length of said reflector segments being selected so that the incident radiation is reflected back and forth between the segments until the fourth and sixth reflection emerges downwardly from between the reflector segments in a beam which is much narrower than the space between the upper ends of the reflector segments, and at least one collector for solar radiation positioned beneath said reflector segments, other than the first segment in the series, and paralleling said segments to receive said narrowed beam.

2. A solar collector as recited in claim 1 in which said solar collector is constituted by an elongated tube carrying a heat transfer medium and a secondary reflector is positioned beneath said elongated tube to concentrate the reflections emerging from the reflector segments upon said tube.

3. A solar collector as recited in claim 1 in which said secondary reflector is at least partially parabolic.

4. A solar collector as recited in claim 1 in which said secondary reflector is constituted by a dual cusp reflector.

5. A nontracking concentrating solar collector comprising a series of parallel parabolic reflector segments reflective on both surfaces thereof, the focal points of said reflectors lying in a plane which is at approximately a right angle to the angle of incident solar radiation which is received in the space between the upper ends of said reflector segments, the length of said reflector segments being selected so that the incident radiation is reflected back and forth between the segments until either the fourth or the sixth reflection emerges downwardly from between the reflector segments, at least one tubular collector for solar radiation positioned beneath said reflector segments other than the first segment in the series, and paralleling said segments, and a secondary reflector positioned beneath said tubular collector to concentrate the reflections emerging from the reflector segments upon said collector.

6. A solar collector as recited in claim 5 in which the angle between the upper end of the parabolic segments and the focal plane thereof is substantially 45° with the upper ends of these segments terminating in the focal plane.

7. A solar collector as recited in claim 6 in which the reflector segments have a parabolic function corresponding to the equation $y = x^2/20$.

8. A solar collector as recited in claim 7 in which the parabolic minima of the several segments forms a line paralleling the focal plane with the distance between the upper ends of the reflectors being the same as the distance between the focal plane and the plane of the parabolic minima.

9. A solar collector as recited in claim 5 in which the space between said reflector segments is open to allow wind to pass through the collector.

* * * * *